(12) United States Patent
Dadam et al.

(10) Patent No.: US 11,136,949 B1
(45) Date of Patent: Oct. 5, 2021

(54) METHODS AND SYSTEMS FOR VEHICLE DIAGNOSTICS

(71) Applicant: Ford Global Technologies, LLC, Dearborn, MI (US)

(72) Inventors: Sumanth Reddy Dadam, Dearborn, MI (US); Douglas Martin, Canton, MI (US); Robert Jentz, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/997,190

(22) Filed: Aug. 19, 2020

(51) Int. Cl.
| | | |
|---|---|---|
| *F02M 35/08* | (2006.01) | |
| *F02B 37/12* | (2006.01) | |
| *F02B 37/04* | (2006.01) | |
| *F02D 23/00* | (2006.01) | |

(52) U.S. Cl.
CPC ........... *F02M 35/086* (2013.01); *F02B 37/04* (2013.01); *F02B 37/12* (2013.01); *F02D 23/00* (2013.01)

(58) Field of Classification Search
None
See application file for complete search history.

(56) References Cited

U.S. PATENT DOCUMENTS

| | | | |
|---|---|---|---|
| 10,323,562 B2 | 6/2019 | Van Nieuwstadt et al. | |
| 10,954,874 B2 * | 3/2021 | Dudar | F02M 35/10386 |
| 2019/0257235 A1 | 8/2019 | Van Nieuwstadt et al. | |
| 2019/0292959 A1 | 9/2019 | Dudar | |

FOREIGN PATENT DOCUMENTS

JP      2013170978 A     9/2013

* cited by examiner

*Primary Examiner* — Audrey B. Walter
*Assistant Examiner* — Edward Bushard
(74) *Attorney, Agent, or Firm* — Geoffrey Brumbaugh; McCoy Russell LLP

(57) ABSTRACT

Methods and systems are provided for a turbocharger of a hybrid vehicle. In one example, a method comprising spinning a turbine in a reverse direction during an engine off event to execute a diagnostic test.

18 Claims, 7 Drawing Sheets

METHODS AND SYSTEMS FOR VEHICLE DIAGNOSTICS

FIELD

The present description relates generally to utilizing an electric turbocharger to execute vehicle diagnostics.

BACKGROUND/SUMMARY

Engine systems may utilize an exhaust gas recirculation system to decrease regulated emissions. A particulate filter may be further included in an aftertreatment system of a vehicle to further decrease emissions. In some examples, the delta pressure sensor is arranged upstream of the EGR valve relative to a direction of EGR flow. However, contaminants in the EGR resulting in degradation of the delta pressure sensor. Later examples included moving the delta pressure sensor downstream of the EGR valve to decrease contact between EGR contaminants and the delta pressure sensor. Based on the delta pressure positioning downstream of the EGR valve, the hose reverse test is executed with the EGR valve closed. Intake pressures are adjusted by adjusting the engine RPM to determine if the hoses are reversed based on a sensed delta pressure. However, the method may not be executed if a hose is loose.

A delta pressure for the particulate filter may also be sensed to determine a status of the particulate filter. In one example, the delta pressure is used to determine if the particulate filter demands a regeneration. Similar to the EGR delta pressure sensor, the particulate filter delta pressure sensor may utilize a pair of hoses. As such, diagnostic methods for determining if a hose of the pair of hoses is detached may be desired.

In one example, the issues described above may be addressed by a method comprising spinning an electric turbocharger in a reverse direction in response to an engine no longer spinning to perform a diagnostic test. In this way, integrity and repeatability of a diagnostic test may be enhanced.

As one example, reverse spinning the electric turbocharger results in gases flowing from the exhaust passage to an engine or an EGR passage. Reverse spinning the electric turbocharger may be further used to de-ice an intake air filter. In one example, a delta pressure hose diagnostic may be executed with a wastegate in a closed position to block gases from exiting the exhaust manifold. The throttle valve is also moved to a closed position. In the example of de-icing the intake air filter, the throttle valve and wastegate may be moved to an open position and the electric turbocharger is rotated in the reverse direction. De-icing the intake air filter may further be executed following an engine shutdown while the engine is still hot. By doing this, the de-icing may be executed prior to one or more hose diagnostic tests following the engine shutdown. In this way, diagnostics and cleaning may be synergistically combined with the electric turbocharger (eturbo) system to increase an integrity of the vehicle diagnostics while prolonging a longevity and enhancing a filtering of the intake air filter.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
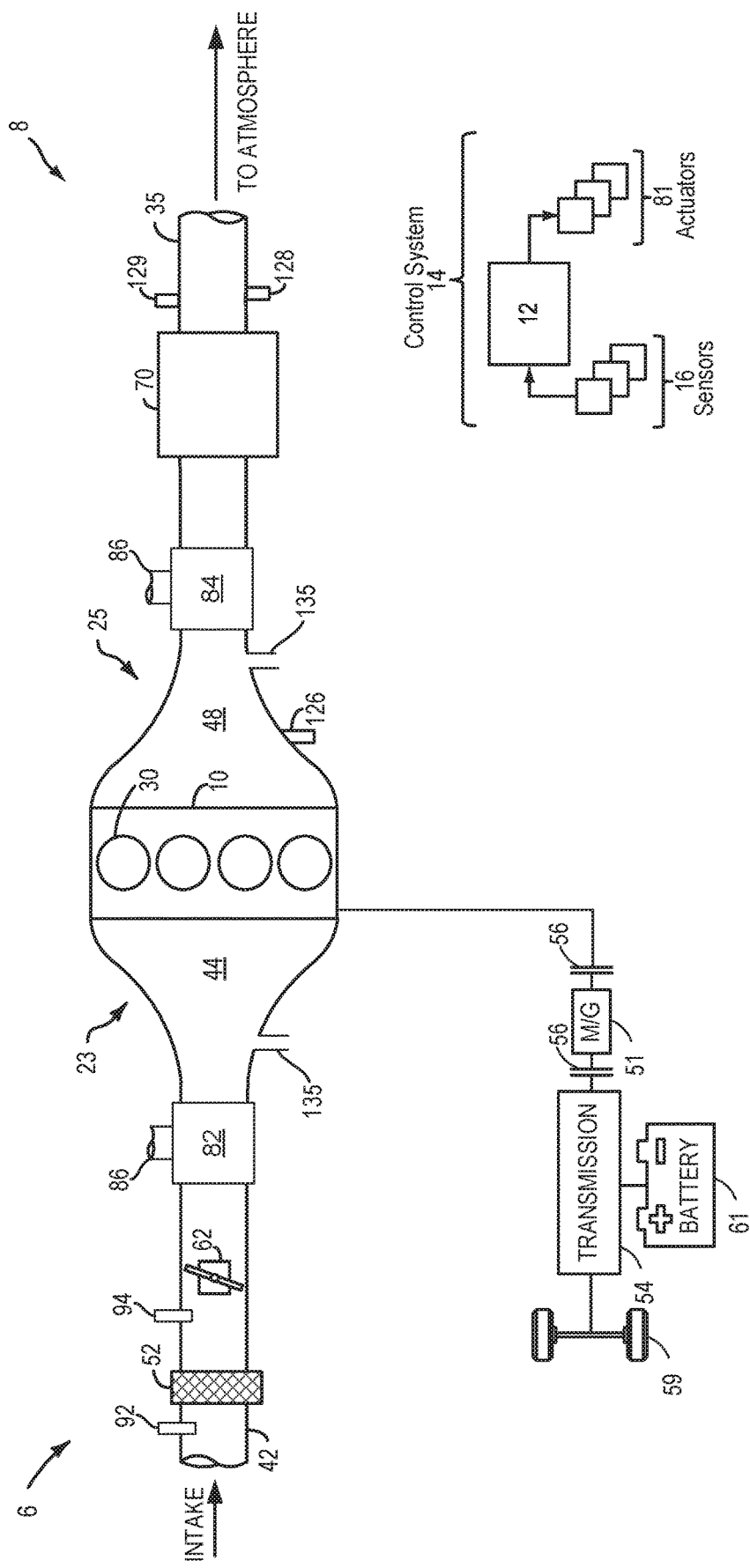
FIG. 1 illustrates a schematic of an engine included in a hybrid vehicle.
Figure 2:
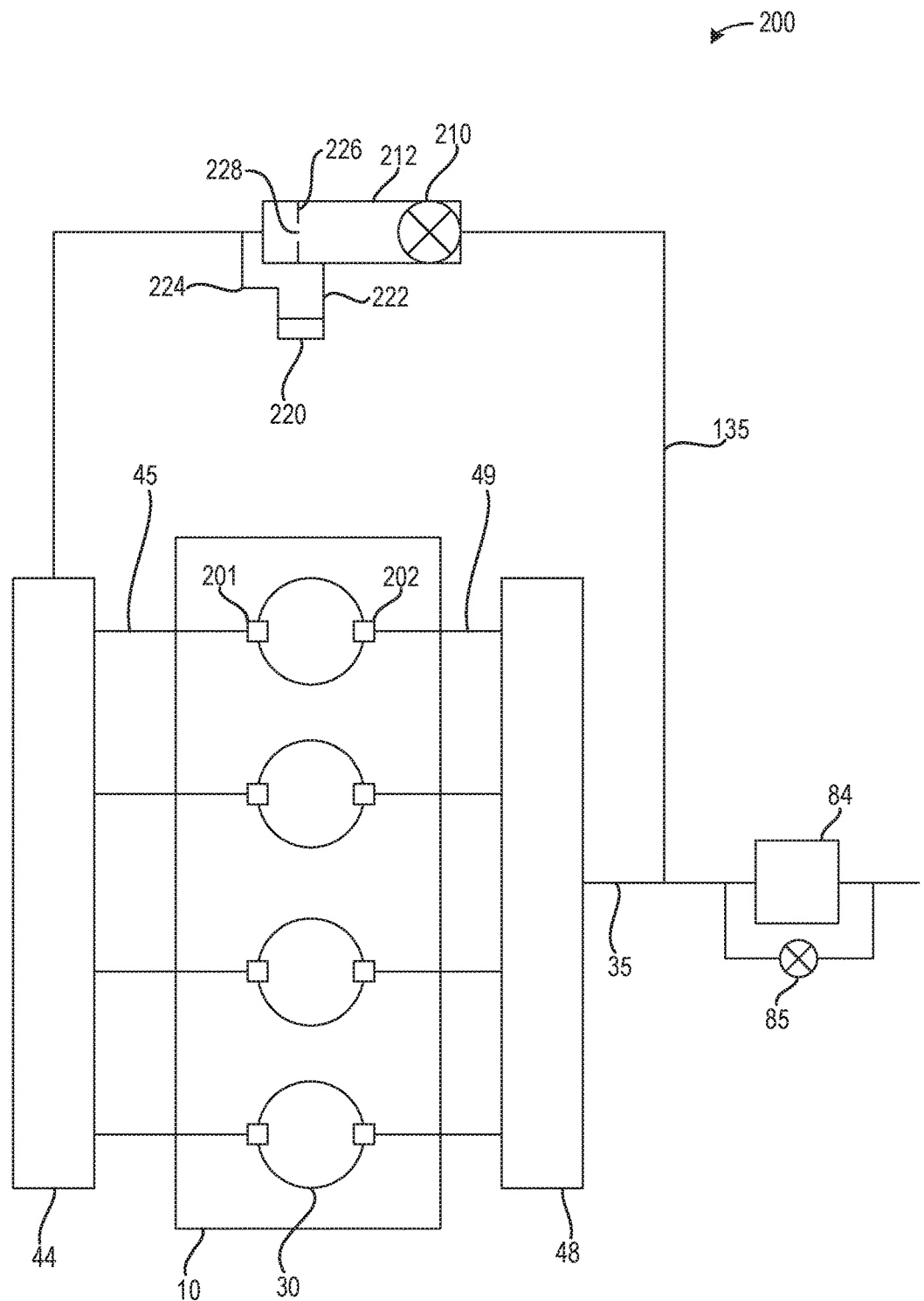
FIG. 2 illustrates an example system of the engine comprising an EGR delta pressure sensor.
Figure 3:
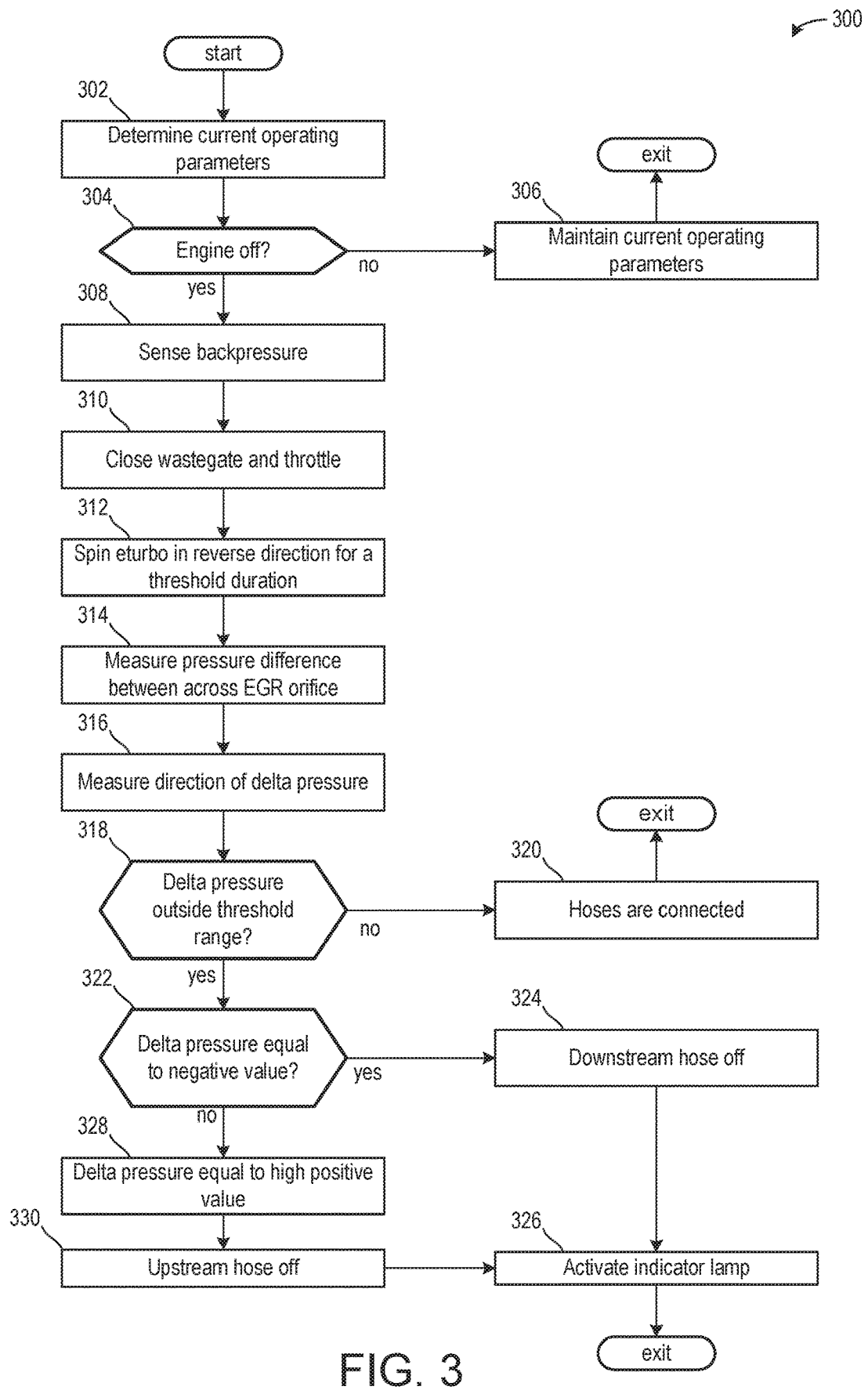
FIG. 3 illustrates a method for determining a hose off condition of the EGR delta pressure sensor.

The following description relates to systems and methods for one or more vehicle diagnostics. In one example, the vehicle is a hybrid vehicle comprising a turbocharger configured to be rotated via power from an electrical energy storage device, such as a battery. An example of the vehicle is illustrated in FIG. 1. The electric turbocharger may be spun in reverse to determine a hose off of an exhaust gas recirculation (EGR) delta pressure sensor. A system of the EGR delta pressure sensor is shown in FIG. 2 and a method for executing a diagnostic test for determining if a hose is off of the EGR delta pressure sensor is shown in FIG. 3.

Figure 4:
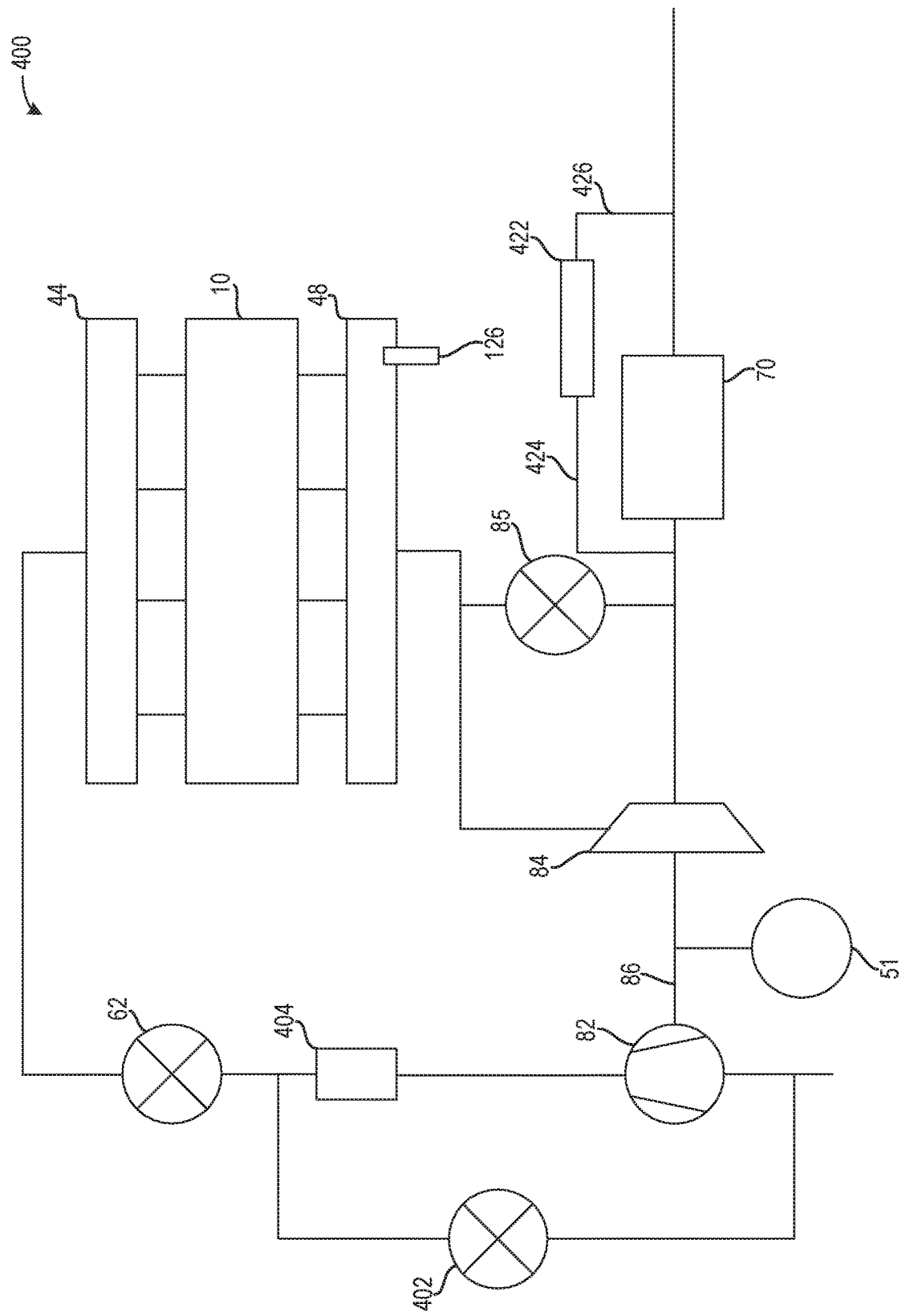
FIG. 4 illustrates an example system of an exhaust passage of the engine free of an exhaust tuning valve downstream of a particulate filter with a particulate filter delta pressure sensor.
Figure 5:
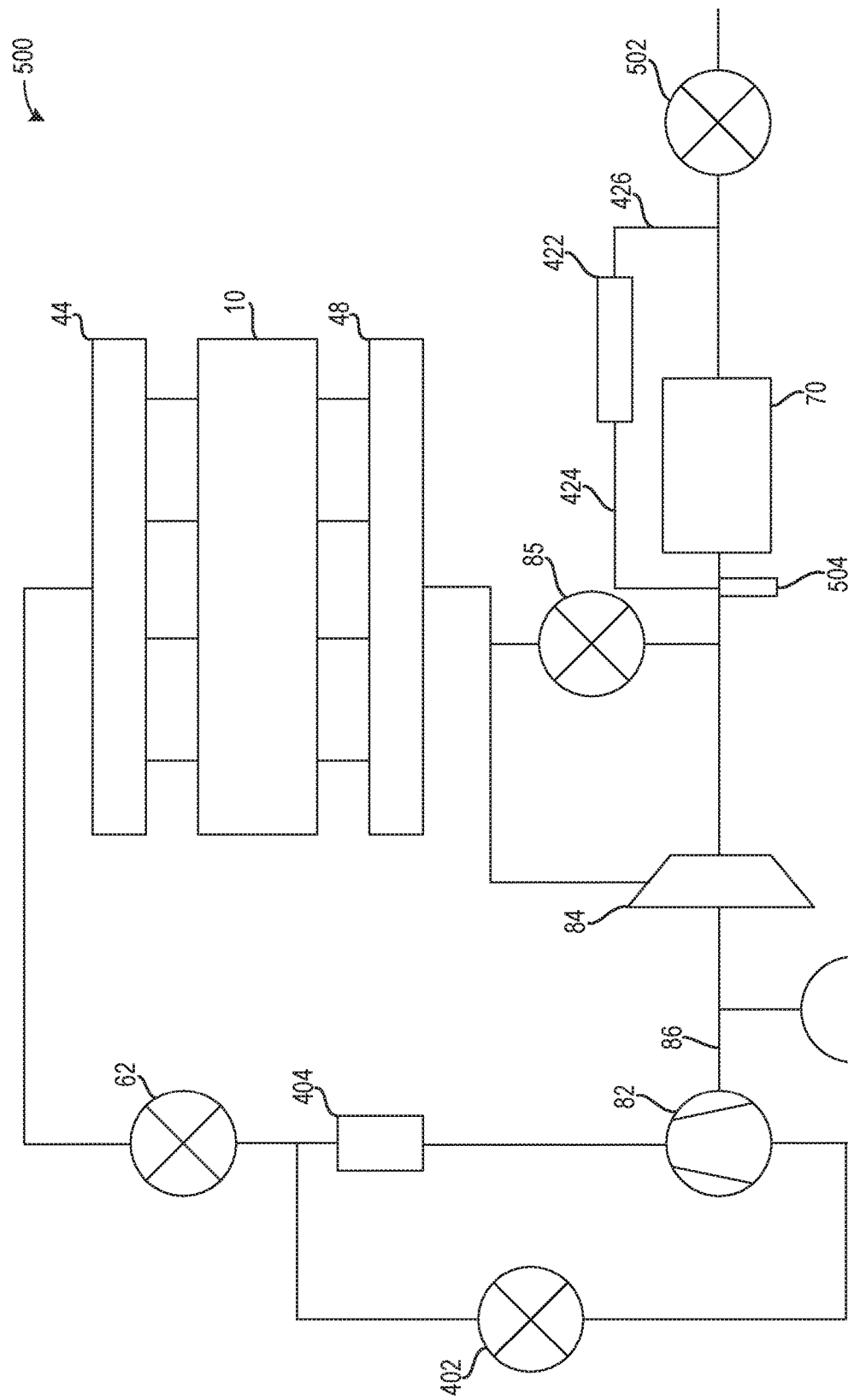
FIG. 5 illustrates an example system of an exhaust passage of the engine comprising an exhaust tuning valve downstream of a particulate filter with a particulate filter delta pressure sensor.
Figure 6:
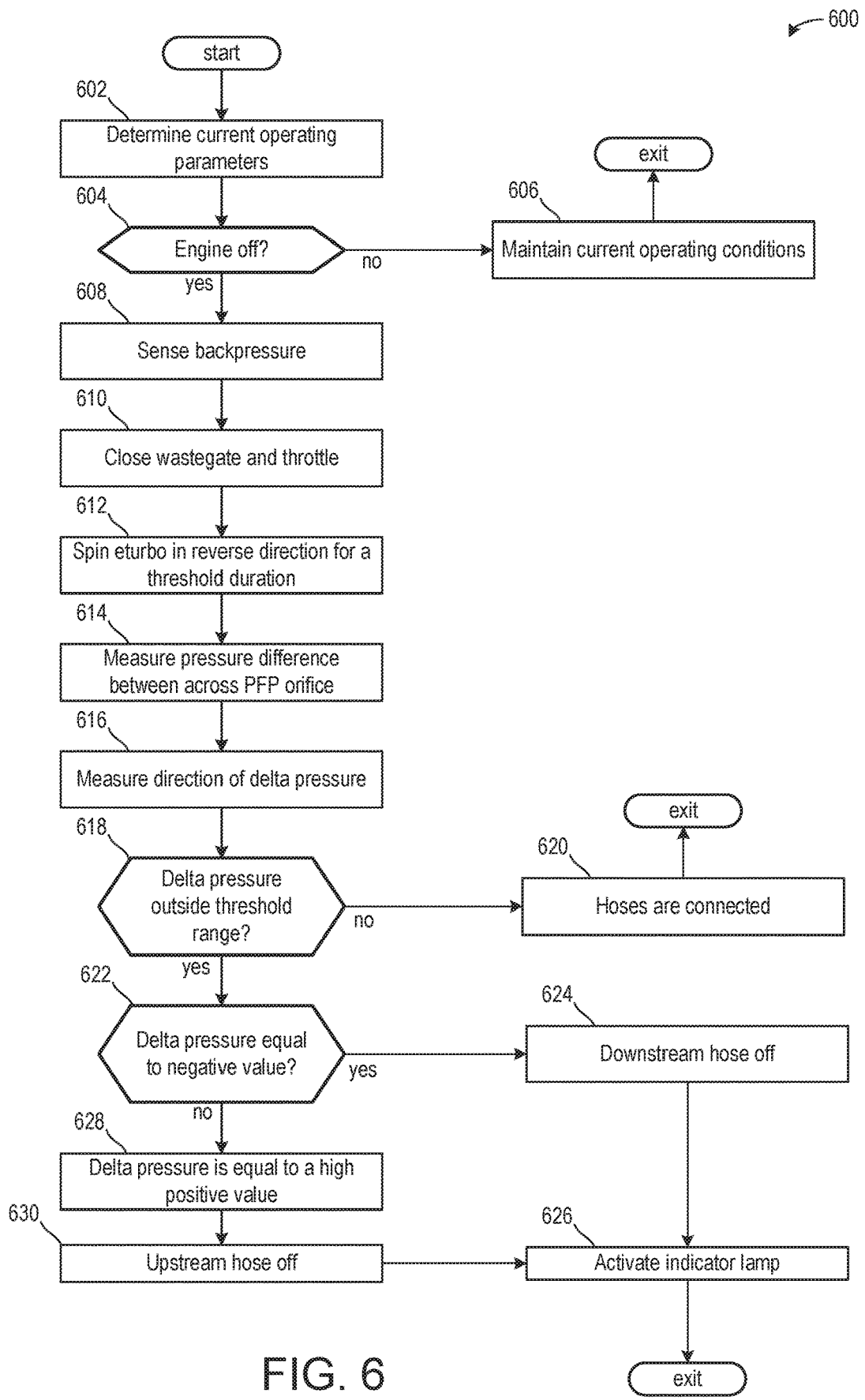
FIG. 6 illustrates a method for determining a hose off condition of the particulate filter delta pressure sensor when the exhaust passage is free of the exhaust tuning valve.
Figure 7:
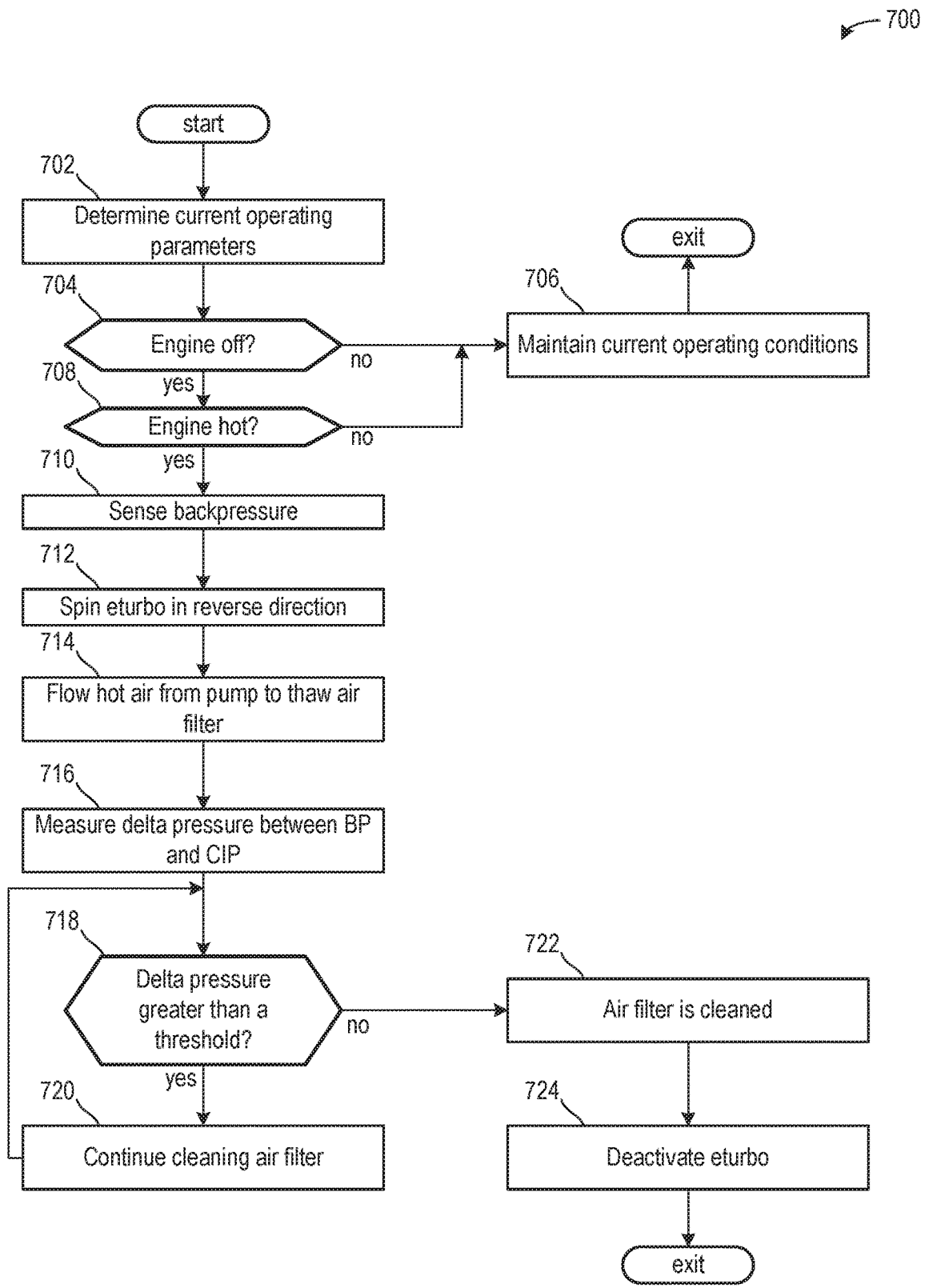
FIG. 7 illustrates a method for de-icing an air filter arranged in an intake passage of the engine.

FIGS. 4 and 5 show various embodiments of an exhaust passage free of an exhaust tuning valve and with an exhaust tuning valve, respectively. A method for determining a hose off of the particulate filter delta pressure sensor where the exhaust tuning valve is not present is illustrated in FIG. 6. The electric turbocharger may be further used to de-ice an intake air filter, wherein FIG. 7 illustrates a method for de-icing the intake air filter.

FIG. 1 shows a schematic depiction of a hybrid vehicle system 6 that can derive propulsion power from engine system 8 and/or an on-board energy storage device. An energy conversion device, such as a generator, may be operated to absorb energy from vehicle motion and/or engine operation, and then convert the absorbed energy to an energy form suitable for storage by the energy storage device.

Engine system 8 may include an engine 10 having a plurality of cylinders 30. Engine 10 includes an engine intake 23 and an engine exhaust 25. Engine intake 23 includes an air intake throttle 62 fluidly coupled to the engine intake manifold 44 via an intake passage 42. Air may enter intake passage 42 via air filter 52. Engine exhaust 25 includes an exhaust manifold 48 leading to an exhaust passage 35 that routes exhaust gas to the atmosphere. Engine exhaust 25 may include at least one emission control device 70 mounted in a close-coupled position or in a far underbody position. The emission control device 70 may include a three-way catalyst, lean NOx trap, particulate filter, oxidation catalyst, etc. It will be appreciated that other components may be included in the engine such as a variety of valves and sensors, as further elaborated in herein. In some embodiments, wherein engine system 8 is a boosted engine system, the engine system may further include a boosting device, such as a turbocharger (not shown).

In the example of the present disclosure, the emission control device 70 is a particulate filter 70. In one example, the particulate filter 70 is a gasoline particulate filter. In another example, the particulate filter 70 is a diesel particulate filter.

The engine system 8 further comprises an electric turbocharger having a compressor 82 and a turbine 84. The compressor 82 and the turbine 84 are mechanically coupled via a shaft 86. The turbine 84 may be driven by an electric machine 51 during some engine operating conditions. In the examples of the present disclosure, the turbine 84 may be driven via the electric machine 51 to execute one or more diagnostic tests regarding delta pressure sensors of an EGR passage 135 and the particulate filter 70. Furthermore, the turbine 84 may be electrically driven to de-ice the air filter 52 in conjunction with feedback from a backpressure sensor 92 and a clean-in place sensor 94.

In the example of FIG. 1, the EGR passage 135 is a high-pressure EGR passage configured to direct exhaust gases from upstream of the turbine 84 and downstream of the compressor 82. The engine system 8 may additionally or alternatively comprise a low-pressure EGR passage.

Vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, and pressure sensor 129. Other sensors such as additional pressure, temperature, air/fuel ratio, and composition sensors may be coupled to various locations in the vehicle system 6. As another example, the actuators may include the throttle 62.

Controller 12 may be configured as a conventional microcomputer including a microprocessor unit, input/output ports, read-only memory, random access memory, keep alive memory, a controller area network (CAN) bus, etc. Controller 12 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

In some examples, hybrid vehicle 6 comprises multiple sources of torque available to one or more vehicle wheels 59. In other examples, vehicle 6 is a conventional vehicle with only an engine, or an electric vehicle with only electric machine(s). In the example shown, vehicle 6 includes engine 10 and the electric machine 51. Electric machine 51 may be a motor or a motor/generator. A crankshaft of engine 10 and electric machine 51 may be connected via a transmission 54 to vehicle wheels 59 when one or more clutches 56 are engaged. In the depicted example, a first clutch 56 is provided between a crankshaft and the electric machine 51, and a second clutch 56 is provided between electric machine 51 and transmission 54. Controller 12 may send a signal to an actuator of each clutch 56 to engage or disengage the clutch, so as to connect or disconnect crankshaft from electric machine 51 and the components connected thereto, and/or connect or disconnect electric machine 51 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 51 receives electrical power from a traction battery 61 to provide torque to vehicle wheels 59. Electric machine 51 may also be operated as a generator to provide electrical power to charge battery 61, for example during a braking operation.

Turning now to FIG. 2, it shows an embodiment 200 of the engine 10 comprising the cylinders 30. As such, components previously introduced may be similarly numbered in this figure. The intake manifold 44 comprise a plurality of intake runners 45, wherein each runner fluidly couples the intake manifold 44 to an individual cylinder of the cylinders 30 based on an intake valve position of a plurality of intake valves 201. A plurality of exhaust runners 49 fluidly couple the cylinders 30 to the exhaust manifold 48 based on an exhaust valve position of a plurality of exhaust valves 202.

The exhaust passage 35 is configured to direct exhaust gases from the exhaust manifold 48 to an ambient atmosphere. An EGR passage 135 branches off of the exhaust passage 35 and is configured to direct exhaust gases from the exhaust passage 35 to the intake manifold 44. Additionally or alternatively, the EGR passage 135 may be fluidly coupled to a portion of an intake passage upstream of the intake manifold 44.

The EGR passage 135 comprises an EGR valve 210. The EGR valve 210 is configured to adjust to a fully open position, a fully closed position, or positions therebetween. The EGR valve 210 may comprise an actuator configured to receive instructions from a controller, such as controller 12 of FIG. 1.

A delta pressure sensor 220 is arranged downstream of the EGR valve 210 within a shared housing 212. The delta pressure sensor 220 comprises a first hose 222 and a second hose 224. The first hose 222 is arranged on an upstream side of a restriction 226 and the second hose 224 is arranged on a downstream side of the restriction 226. In this way, the first hose 222 directs gases from a portion of the shared housing 212 between the EGR valve 210 and the restriction 226 to the delta pressure sensor 220. The second hose 224 directs gases from a portion of the shared housing 212 between the restriction 226 and an outlet of the shared housing 212.

The restriction 226 comprises an orifice 228 through which gases may flow through. The orifice 228, along with the first hose 222 and the second hose 224, may be sized proportionally to one another based on a configuration of the engine 10 and the EGR passage 35. The orifice 228 may comprise an opening size between 5 to 50 mm. In one example, the orifice 228 is between 5 to 20 mm. In one example, the orifice 228 is 10 mm.

Furthermore, the first hose 222 and the second hose 224 may comprise different lengths and diameters. The first hose 222 and the second hose 224 may comprise a specific orientation. In one example, such as the example of FIG. 3, a method of determining if one of the first hose 222 or the second hose 224 is disconnected. During the diagnostic, a wastegate valve 85 is moved to a fully closed position and gas exchange through the engine is blocked while the engine is shutdown (e.g., no combustion occurs). In one example, the gas exchange is blocked via closing the wastegate valve 85, closing the throttle valve (e.g., throttle valve 62 of FIG. 1), and the crankshaft no longer rotating. By doing this, the pressure through the EGR passage 135, and the shared housing 212 is fixed as the turbine 84 is spun in reverse via an electric motor (e.g., electric machine 51 of FIG. 1). The crankshaft no longer rotating may further comprise where a final position of the crankshaft corresponds to intake and exhaust valve positions where at least one of the intake valve or the exhaust valve is in a fully closed position to block air exchange through the engine 10.

Turning now to FIG. 3, it shows a method 300 for determining if a hose of the delta pressure sensor of the EGR valve is detached. Instructions for carrying out method 300 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

The method 300 begins at 302, which includes determining, estimating, and/or measuring one or more current operating parameters. The one or more current operating parameters may include but are not limited to an engine speed, a throttle position, an EGR flow rate, a vehicle speed, an engine temperature, and an air/fuel ratio.

The method 300 proceeds to 304, which includes determining if the engine is off. When the engine is off, fuel injections are blocked, spark does not occur, and the engine is not spinning. Additionally or alternatively, at least one of the intake valves and the exhaust valves of the engine may be held closed. Additionally or alternatively, the engine may be off in response to a crankshaft position, wherein the crankshaft position is such that the intake and exhaust valve positions do not overlap (e.g., one of the intake and exhaust valves is fully closed) to block gas flow through the engine. In some examples, the engine is off only when the vehicle is off. Additionally or alternatively, the engine may be off while the vehicle is on. In such an example, the vehicle may comprise an electric vehicle (EV) mode where the electric machine is configured to provide power to a differential and rotate wheels of the vehicle without power being supplied from the engine. Thus, the engine off may at least comprise where exhaust gases are not produced.

If the engine is not off and thus still combusting fuel or gases are still flowing therethrough due to rotation of the crankshaft not yet stopping, then the method 300 proceeds to 306 to maintain current operating parameters. Furthermore, a EGR delta pressure hose diagnostic test is not executed.

If the engine is off and the engine is not spinning, then the method 300 proceeds to 308 to sense a backpressure. In one example, the backpressure is sensed via the exhaust gas sensor 126 of FIG. 1.

The method 300 proceeds to 310, which includes closing the wastegate and the throttle. By doing this, air between the throttle and wastegate may be sealed from an ambient environment.

The method 300 proceeds to 312, which includes spinning the turbine in a reverse direction for a threshold duration. In one example, a forward direction corresponds to a direction that pushes gases toward a tailpipe of the exhaust passage. The forward direction corresponds to a direction of the turbine when the engine is on and producing exhaust gases. As such, the reverse direction pushes gases away from the tailpipe, toward the exhaust manifold of the engine. In one example, the turbine is spun at a fixed speed during the engine off event. The threshold duration may be based on an amount of time used to stabilize gas pulsations within interior volumes of the various passages of the engine system. In one example, the remainder of the method 300 is executed during the threshold duration. In some examples, the threshold duration may be less than 10 seconds. Additionally or alternatively, the threshold duration may be less than 5 seconds. In one example, the threshold duration is 2 seconds.

In one example, the turbine speed during the engine off event may be based on an estimated duration of the engine off event. For example, as the estimated duration decreases, the turbine speed may be increased to more quickly execute the diagnostic test. As the estimated duration increases, the turbine speed may be decreased to decrease energy consumption.

The method 300 proceeds to 314, which includes measuring a pressure difference (e.g., delta pressure) across the EGR orifice. In one example, the pressure difference is sensed via the delta pressure sensor 220 of FIG. 2. The pressure difference is sensed during the threshold duration as the turbine spins in the reverse direction at the fixed speed.

The method 300 proceeds to 316 to measure a direction of the pressure difference. That is to say, a positivity or a negativity of the pressure difference. In this way, an absolute value of the pressure difference is not determined.

The method 300 proceeds to 318, which includes determining if the delta pressure is outside a threshold range. In one example, the threshold range is from zero to a positive value. As such, negative values are not included in the threshold range. If the delta pressure is within the threshold range, then the method 300 proceeds to 320, which includes determining the hoses are connected. As such, the EGR delta pressure sensor passes the diagnostic and an indicator lamp is not activated.

If the delta pressure is outside of the threshold range, then the method 300 proceeds to 322 to determine if the delta pressure is equal to a negative value. If the delta pressure is equal to a negative value, then the method 300 proceeds to 324, which includes where the downstream hose is off. For example, the second hose 224 of FIG. 2 is off (e.g., disconnected). The method 300 then proceeds to 326 to activate an indicator lamp to signal to the vehicle operator that maintenance is desired.

Returning to 322, if the delta pressure is not equal to a negative value, then the method 300 proceeds to 328, which includes where the delta pressure is equal to a high positive pressure value, wherein the high positive pressure value is greater than a highest positive value of the threshold range. The method 300 then proceeds to 330, which includes where the upstream hose is off (e.g., disconnected). The indicator lamp is then activated at 326.

Turning now to FIG. 4, it shows an embodiment 400 of the engine 10. In the embodiment 400, a compressor recirculation valve 402 is configured to reroute charge air from downstream of a charge-air cooler 404 to upstream of the compressor 82.

The embodiment 400 further comprises a wastegate 85 configured to direct exhaust gases away from the turbine 84 and directly to the particulate filter 70. As such, less exhaust gas may flow to the turbine 84 when the wastegate 85 is in an open position. In one example, the wastegate 85 may be actuated between a fully closed position, a fully open position, and positions therebetween. For example, the wastegate 85 may be actuated to a more open position, which may allow more exhaust gas to bypass the turbine 84 than a more closed position.

The particulate filter 70 comprises a particulate filter pressure sensor 422. The particulate filter pressure sensor 422 comprises an upstream hose 424 and a downstream hose 426. The upstream hose 424 is configured to provide a pressure from upstream of the particulate filter 70 to the particulate filter pressure sensor 422 and the downstream hose 426 is configured to provide a pressure from downstream of the particulate filter 70 to the particulate filter pressure sensor 422 with respect to a direction of exhaust gas flow. A method for detecting a hose off condition of the particulate filter pressure sensor 422 is illustrated with respect to FIG. 6.

Turning to FIG. 5, it shows an embodiment 500 of the engine 10. In one example, the embodiment 500 is identical to the embodiment 400 of FIG. 4, except that the embodiment 500 comprises an exhaust tuning valve 502 and a particulate filter gage sensor 504. In one example, via incorporation of the particulate filter gage sensor 504, the exhaust gas sensor 126 may be omitted.

Turning now to FIG. 6, it shows a method 600 for determining a hose off condition for the particulate filter pressure sensor 422 of FIG. 4. As such, the method 600 may determine if the upstream hose 424 or the downstream hose 426 is disconnected from the particulate filter pressure sensor 422. In one example, the method 600 may be synergistically executed in combination with the method 400 of FIG. 4 within a shared engine-off event. In this way, energy penalties of the hose-off diagnostic tests may be reduced relative to executed the tests separately. In some examples, additionally or alternatively, the methods 400 and 600 may be executed separately.

The method 600 may be substantially identical to the method 300 of FIG. 3. More specifically, steps 602, 604, 606, 608, 610 and 612 are identical to steps 302, 304, 306, 308, 310, and 312, respectively.

As such, the diagnostic method for determining if a hose of the particulate filter pressure sensor is disconnected is also executed following an engine-off event. As described above, the engine-off event comprises where the engine is no longer combusting fuel. In the example of the present disclosure, the engine off event for executing the diagnostic test may further include air exchange through the engine is stopped via a final crankshaft position corresponding to a position where the intake and exhaust valves do not overlap. In one example, if the final crankshaft position corresponding to a position where the intake and exhaust valves do not overlap, then the method may abort the diagnostic test. Additionally or alternatively, the crankshaft may be intrusively rotated to a position where at least one of the intake valve or the exhaust valve is moved to a fully closed position. Additionally or alternatively, a valve actuator may be signaled to intrusively actuate at least one of the intake valve or the exhaust valve to a fully closed position to allow the diagnostic to occur independent of the final crankshaft position.

The method 600 proceeds to 614 following spinning the eturbo in the reverse direction, which includes measuring a pressure difference across the particulate filter pressure sensor during the threshold duration of the turbine spinning at the fixed speed. The pressure difference may be based on an exhaust pressure sensed via exhaust gases flowing through an upstream hose and a downstream hose.

The method 600 proceeds to 616, which includes measuring a direction of a delta pressure. That is to say, a positivity or a negativity of the pressure difference. In this way, an absolute value of the pressure difference is not determined.

The method 600 proceeds to 618, which includes determining if the delta pressure is outside of a threshold range. In one example, the threshold range is from zero to a positive value. As such, negative values are not included in the threshold range. If the delta pressure is within the threshold range, then the method 600 proceeds to 620, which includes determining the hoses are connected. As such, the particulate filter pressure sensor passes the diagnostic and an indicator lamp is not activated.

If the delta pressure is outside the threshold range, then the method 600 proceeds to 622, which includes determining if the delta pressure is equal to a negative value. If the delta pressure is equal to a negative value, then the method 600 proceeds to 624, which includes determining that the downstream hose is off. The method 600 proceeds to 626, which includes activating an indicator lamp. In some example, activating the indicator lamp may further include displaying a message on an infotainment system or sending the message to an email or a phone of a vehicle operator indicating a maintenance request.

If the delta pressure is not equal to a negative value, then the delta pressure is equal to a relatively high positive at 628. The method 600 proceeds to 630, which includes determining the upstream hose is off. The method 600 may then proceed to 626 to activate the indicator lamp.

In one example, the method 600 may be adjusted to accommodate the embodiment 500 of FIG. 5. In one example, the exhaust tuning valve may be adjusted to produce variations in exhaust backpressure. During conditions where hoses of the particulate filter delta pressure are connected, the differential pressure may be the only pressure sensed by the delta pressure sensor. If the downstream hose is disconnected, then the pressure sensed may include downstream backpressure variations due to atmospheric conditions being sensed by the downstream hose. By utilizing the eturbo, diagnostic of the delta pressure hoses in combination with the exhaust tuning valve may be executed more reliably since the exhaust tuning valve may not be fully opened and fully closed for a sufficient duration. In one example, the diagnostic includes opening the exhaust tuning valve and determining a differential pressure during the valve open phase. The diagnostic then includes closing the exhaust tuning valve and determining a differential pressure during the valve closed phase. As described above, the open phase and the closed phase may be executed during the phase in which the eturbo is spun in reverse. The diagnostic may determine differences between the differential pressures measured during the open phase and the closed phase relative to the threshold range as described above.

Turning now to FIG. 7, it shows a method 700 for de-icing an intake air filter. In one example, the intake air filter may create a restriction in the intake passage due to the filter being wet or snow accumulating thereon. Furthermore, system diagnostics may sense false positive results for the intake air filter due to noise factors. In this way, method 700 illustrates a further use of reverse spinning the electric turbine during the engine-off event.

The method 700 begins at 702, which includes determining, estimating, and/or measuring one or more current operating parameters. The one or more current operating parameters may include but are not limited to an engine speed, a throttle position, an EGR flow rate, a vehicle speed, an engine temperature, and an air/fuel ratio.

The method 700 proceeds to 704, which includes determining if the engine is off.

If the engine is not off, then the method 700 proceeds to 706 to maintain current operating conditions and does not reverse spin the electric turbo.

If the engine is off, then the method 700 proceeds to 708 to determine if the engine is hot. In one example, the engine is hot if an engine temperature is greater than a threshold temperature. The threshold temperature may be equal to an ambient temperature, in one example. In another example, the threshold temperature is based on a percentage of a desired engine operating temperature. For example, the threshold temperature may be equal to 20%, 50%, 70%, or 90% of the desired engine operating temperature. If the engine is not hot following the engine off, then the method 700 proceeds to 706 to maintain current operating conditions.

In one example, if the engine is not hot following the engine off event, then the method 700 may proceed to one of the method 300 of FIG. 3 or the method 600 of FIG. 6. In this way, the method 700 may be executed prior to the methods 300 or 600 to utilize a latent engine heat.

If the engine is hot following the engine off event, then the method 700 proceeds to 710, which includes sensing an exhaust backpressure. In one example, the exhaust gas sensor 126 of FIG. 1 arranged in the exhaust gas manifold may be used to sense the exhaust backpressure.

The method 700 proceeds to 712, which includes opening the throttle and spinning the eturbo in the reverse direction. As such, the turbine pumps gases into the exhaust manifold and the compressor pumps gases from the intake manifold, through the intake passage, and to an ambient atmosphere.

In one example, the method 700 may be executed in tandem with the method 600 of FIG. 6. That is to say, the exhaust passage and the intake passage may be sealed from one another via sealing of the engine and the EGR valve such that the intake gases stored in the intake passage may be used to thaw the air filter while gases stored in the exhaust passage may be used to determine a hose off condition of the particulate filter delta pressure sensor.

The method 700 proceeds to 714, which includes flowing hot air from the engine to the air filter (e.g., air filter 52 of FIG. 1). As such, ice may begin to thaw and/or water may begin to evaporate.

The method 700 proceeds to 716, which includes measuring a delta pressure between a backpressure sensor and a clean-in place sensor. In one example, the delta pressure sensed via a combination of the backpressure valve 92 and the clean-in place sensor 94 of FIG. 1.

The method 700 proceeds to 718, which includes determining if the delta pressure is greater than a threshold delta pressure. The threshold delta pressure may be based on a delta pressure resulting from the air filter being clogged with snow, ice, or water and air not flowing desirably therethrough.

If the delta pressure is greater than the threshold delta pressure, then the method 700 proceeds to 720, which includes continuing to clean the air filter. As such, the eturbo may continue to spin in reverse. If the delta pressure is not greater than the threshold delta pressure, then the method 700 proceeds to 722 to indicate the air filter is cleaned. The method 700 then proceeds to 724, which includes deactivating the eturbo.

In the example of FIG. 7, the thawing and/or the drying of the intake air filter is executed without sensing a desire to thaw/dry the intake air filter. However, as described above, a request to thaw/dry the filter may be sensed and the cleaning of method 700 may be signaled to be executed upon an upcoming engine off event. If the request is accurate, then the delta pressure sensed during the cleaning will be greater than the threshold delta pressure. However, if the request is inaccurate, which may be due to noise, then the delta pressure sensed during the method 700 will be less than the threshold delta pressure. In one example, the conditions that led to the inaccurate request may be stored in memory to reduce a number of future inaccurate cleaning requests. Additionally or alternatively, the air filter cleaning may be executed in response to an ambient weather condition (e.g., snowing, raining, freezing temperatures, etc.) and/or a fixed interval elapsing, wherein the interval may be a measure of time or distance.

In this way, a hybrid vehicle comprising a turbocharger configured to be driven electrically during at least some conditions is configured to drive the turbocharger in a reverse direction to perform one or more diagnostic tests. Additionally or alternatively, the turbocharger may be driven in the reverse direction to clean an intake air filter. The technical effect of driving the electric turbocharger in the reverse direction is to utilize a controlled steady test point to make calibration and diagnostic of a hose-off condition for a delta sensor more reliable and predictable. Furthermore, the diagnostic may be executed following each vehicle drive cycle without interfering with other vehicle diagnostics.

An example of a method comprises spinning an electric turbocharger in a reverse direction in response to an engine no longer spinning to perform a diagnostic test.

A first example of the method further comprises where the diagnostic test is a hose-off EGR delta pressure sensor diagnostic.

A second example of the method, optionally including the first example, further includes where the diagnostic test is a hose-off particulate filter delta pressure sensor diagnostic.

A third example of the method, optionally including one or more of the previous examples, further includes where the engine no longer spinning further comprises a final crankshaft position where at least one of an intake valve or an exhaust valve is in a completely closed position.

A fourth example of the method, optionally including one or more of the previous examples, further includes where adjusting a wastegate and a throttle to fully closed positions, wherein the wastegate and the throttle in the fully closed positions block gases from leaving an exhaust manifold or an intake manifold to an ambient atmosphere.

A fifth example of the method, optionally including one or more of the previous examples, further includes where spinning the electric turbocharger in the reverse direction comprises where a turbine flows gases to an exhaust manifold and a compressor flows gases away from an intake manifold.

An example of a system comprises an engine of a hybrid vehicle comprising a cylinder having an intake valve and an exhaust valve, the hybrid vehicle further comprising an electric motor, a turbocharger comprising a turbine and a compressor, wherein the electric motor is configured to drive the turbine and the compressor in a forward direction when the engine is combusting, and wherein the electric motor is configured to drive the turbine and the compressor in a reverse direction when the engine is off, an intake passage fluidly coupled to the engine, wherein a throttle is arranged in the intake passage, a wastegate configured to bypass exhaust gases around the turbine, an EGR passage comprising an EGR delta pressure sensor, a particulate filter comprising a particulate filter delta pressure sensor, and a controller comprising computer-readable instructions stored on non-transitory memory thereof that when executed enable the controller to in response to the engine being off, adjust the throttle and the wastegate to fully closed positions, drive the turbine and the compressor in the reverse direction at a fixed speed for a threshold duration, and sense a delta pressure across one or more of the EGR delta pressure sensor and the particulate filter delta pressure sensor to determine a hose-off condition.

A first example of the system further includes where the hose-off condition comprises a first hose being disconnected in response to the delta pressure being a negative value outside a threshold delta pressure, and wherein the hose-off condition further comprises a second hose being disconnected in response to the delta pressure being a positive value outside the threshold delta pressure.

A second example of the system, optionally including the first example, further includes where the engine off further comprises ceasing combustion and detecting a final crankshaft position corresponds to a position where at least one of the intake valve or the exhaust valve is in a fully closed position.

A third example of the system, optionally including one or more of the previous examples, further includes where the instructions further enable the controller to adjust the throttle and the wastegate to open positions in response to an engine temperature being greater than a threshold engine temperature in response to the engine being off.

A fourth example of the system, optionally including one or more of the previous examples, further includes where the instructions further enable the controller to drive the turbine and the compressor in the reverse direction to flow gases from the exhaust passage to an intake air filter in the intake passage.

A fifth example of the system, optionally including one or more of the previous examples, further includes where the throttle and the wastegate are adjusted to open positions in response to the engine being off in combination with a delta pressure measured across an intake air filter in the intake passage being outside a threshold intake air filter delta pressure range.

A sixth example of the system, optionally including one or more of the previous examples, further includes where the instructions further enable the controller to determine the hose-off condition following the delta pressure measured across the intake air filter being within the threshold intake air filter delta pressure range.

A seventh example of the system, optionally including one or more of the previous examples, further includes where an exhaust tuning valve arranged in an exhaust passage between the particulate filter and an ambient atmosphere.

An eighth example of the system, optionally including one or more of the previous examples, further includes where instructions further enable the controller to indicate an upstream hose or a downstream hose being disconnected if the hose-off condition is determined.

An example of a hybrid vehicle, comprises an intake passage comprising an intake air filter and a throttle, an exhaust passage comprising a particulate filter, an engine comprising a combustion chamber comprising an intake valve configured to fluidly couple the combustion chamber to the intake passage and an exhaust valve configured to fluidly couple the combustion chamber to the exhaust passage, an electric motor, a turbocharger comprising a compressor and a turbine, wherein the engine is configured to drive the turbocharger via exhaust gases flowing to the turbine, and wherein the electric motor is configured to drive the turbocharger via directly rotating a shaft mechanically coupling the compressor to the turbine, wherein the compressor and the turbine spin in a first direction when the engine is combusting, and wherein the electric motor is configured to spin the compressor and the turbine in a second direction, opposite the first direction when the engine is off, and a controller with computer-readable instructions stored on non-transitory memory thereof that when executed enable the controller to in response to the engine being off and a temperature of the engine being greater than a threshold temperature, adjust the throttle to an open position, adjust a wastegate to an open position, and spin the compressor and the turbine in the second direction, and in response to the engine being off and the temperature of the engine being less than the threshold temperature, adjust the throttle and the wastegate to closed positions, spin the compressor and the turbine in the second direction, and determine a hose-off condition of a particulate filter delta pressure sensor and a EGR valve delta pressure sensor.

A first example of the hybrid vehicle further includes where spinning the compressor and the turbine in the second direction comprises a fixed turbine speed.

A second example of the hybrid vehicle, optionally including the first example, further includes where the engine being off comprises a crankshaft position where at least one of the intake valve or the exhaust valve is fully closed, and wherein the engine is no longer spinning.

A third example of the hybrid vehicle, optionally including one or more of the previous examples, further includes where an exhaust tuning valve in the exhaust passage between the particulate filter and a tailpipe, wherein the instructions further enable the controller to adjust the exhaust tuning valve when the engine is off and the temperature of the engine is greater than the threshold temperature.

A fourth example of the hybrid vehicle, optionally including one or more of the previous examples, further includes where the hose-off condition of the particulate filter delta pressure sensor and the EGR valve delta pressure sensor is executed during a shared engine off event.

FIGS. 1-2 and 3-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
spinning an electric turbocharger in a reverse direction in response to an engine no longer spinning to perform a diagnostic test; and
adjusting a wastegate and a throttle to fully closed positions, wherein the wastegate and the throttle in the fully closed positions block gases from leaving an exhaust manifold or an intake manifold to an ambient atmosphere.

2. The method of claim 1, wherein the engine no longer spinning further comprises a final crankshaft position where at least one of an intake valve or an exhaust valve is in a completely closed position.

3. The method of claim 1, wherein spinning the electric turbocharger in the reverse direction comprises where a turbine flows gases to an exhaust manifold and a compressor flows gases away from an intake manifold.

4. A method comprising:
spinning an electric turbocharger in a reverse direction in response to an engine no longer spinning to perform a diagnostic test, wherein the diagnostic test is one or more of a hose-off EGR delta pressure sensor diagnostic and a hose-off particulate filter delta pressure sensor diagnostic.

5. A system, comprising:
an engine of a hybrid vehicle comprising a cylinder having an intake valve and an exhaust valve, the hybrid vehicle further comprising an electric motor;
a turbocharger comprising a turbine and a compressor, wherein the electric motor is configured to drive the turbine and the compressor in a forward direction when the engine is combusting, and wherein the electric motor is configured to drive the turbine and the compressor in a reverse direction when the engine is off;
an intake passage fluidly coupled to the engine, wherein a throttle is arranged in the intake passage;
a wastegate configured to bypass exhaust gases around the turbine;
an EGR passage comprising an EGR delta pressure sensor;
a particulate filter comprising a particulate filter delta pressure sensor; and
a controller comprising computer-readable instructions stored on non-transitory memory thereof that when executed enable the controller to:
in response to the engine being off, adjust the throttle and the wastegate to fully closed positions, drive the turbine and the compressor in the reverse direction at a fixed speed for a threshold duration, and sense a delta pressure across one or more of the EGR delta pressure sensor and the particulate filter delta pressure sensor to determine a hose-off condition.

6. The system of claim 5, wherein the hose-off condition comprises a first hose being disconnected in response to the delta pressure being a negative value outside a threshold delta pressure, and wherein the hose-off condition further comprises a second hose being disconnected in response to the delta pressure being a positive value outside the threshold delta pressure.

7. The system of claim 5, wherein the engine off further comprises ceasing combustion and detecting a final crankshaft position corresponds to a position where at least one of the intake valve or the exhaust valve is in a fully closed position.

8. The system of claim 5, further comprising an exhaust tuning valve arranged in an exhaust passage between the particulate filter and an ambient atmosphere.

9. The system of claim 5, wherein instructions further enable the controller to indicate an upstream hose or a downstream hose being disconnected if the hose-off condition is determined.

10. The system of claim 5, wherein the instructions further enable the controller to adjust the throttle and the wastegate to open positions in response to an engine temperature being greater than a threshold engine temperature in response to the engine being off.

11. The system of claim 10, wherein the instructions further enable the controller to drive the turbine and the compressor in the reverse direction to flow gases from the exhaust passage to an intake air filter in the intake passage.

12. The system of claim 10, wherein the throttle and the wastegate are adjusted to open positions in response to the engine being off in combination with a delta pressure measured across an intake air filter in the intake passage being outside a threshold intake air filter delta pressure range.

13. The system of claim 12, wherein the instructions further enable the controller to determine the hose-off condition following the delta pressure measured across the intake air filter being within the threshold intake air filter delta pressure range.

14. A hybrid vehicle, comprising:
   an intake passage comprising an intake air filter and a throttle;
   an exhaust passage comprising a particulate filter;
   an engine comprising a combustion chamber comprising an intake valve configured to fluidly couple the combustion chamber to the intake passage and an exhaust valve configured to fluidly couple the combustion chamber to the exhaust passage;
   an electric motor;
   a turbocharger comprising a compressor and a turbine, wherein the engine is configured to drive the turbocharger via exhaust gases flowing to the turbine, and wherein the electric motor is configured to drive the turbocharger via directly rotating a shaft mechanically coupling the compressor to the turbine, wherein the compressor and the turbine spin in a first direction when the engine is combusting, and wherein the electric motor is configured to spin the compressor and the turbine in a second direction, opposite the first direction when the engine is off; and
   a controller with computer-readable instructions stored on non-transitory memory thereof that when executed enable the controller to:
      in response to the engine being off and a temperature of the engine being greater than a threshold temperature, adjust the throttle to an open position, adjust a wastegate to an open position, and spin the compressor and the turbine in the second direction; and
      in response to the engine being off and the temperature of the engine being less than the threshold temperature, adjust the throttle and the wastegate to closed positions, spin the compressor and the turbine in the second direction, and determine a hose-off condition of a particulate filter delta pressure sensor and a EGR valve delta pressure sensor.

15. The hybrid vehicle of claim 14, wherein spinning the compressor and the turbine in the second direction comprises a fixed turbine speed.

16. The hybrid vehicle of claim 14, wherein the engine being off comprises a crankshaft position where at least one of the intake valve or the exhaust valve is fully closed, and wherein the engine is no longer spinning.

17. The hybrid vehicle of claim 14, further comprising an exhaust tuning valve in the exhaust passage between the particulate filter and a tailpipe, wherein the instructions further enable the controller to adjust the exhaust tuning valve when the engine is off and the temperature of the engine is greater than the threshold temperature.

18. The hybrid vehicle of claim 14, wherein the hose-off condition of the particulate filter delta pressure sensor and the EGR valve delta pressure sensor is executed during a shared engine off event.

\* \* \* \* \*